United States Patent
Srinivasan et al.

(10) Patent No.: US 11,574,643 B2
(45) Date of Patent: *Feb. 7, 2023

(54) METHODS AND APPARATUS FOR AUDIO SIGNATURE GENERATION AND MATCHING

(71) Applicant: The Nielsen Company (US), LLC, New York, NY (US)

(72) Inventors: Venugopal Srinivasan, Tarpon Springs, FL (US); Alexander Topchy, New Port Richey, FL (US); Sadhana Gupta, Columbia, MD (US)

(73) Assignee: The Nielsen Company (US), LLC, New York, NY (US)

( * ) Notice: Subject to any disclaimer, the term of this patent is extended or adjusted under 35 U.S.C. 154(b) by 239 days.

This patent is subject to a terminal disclaimer.

(21) Appl. No.: 17/129,434

(22) Filed: Dec. 21, 2020

(65) Prior Publication Data

US 2021/0249023 A1    Aug. 12, 2021

Related U.S. Application Data

(63) Continuation of application No. 16/355,243, filed on Mar. 15, 2019, now Pat. No. 10,872,614, which is a
(Continued)

(51) Int. Cl.
*G06F 17/00* (2019.01)
*G10L 19/018* (2013.01)
(Continued)

(52) U.S. Cl.
CPC .......... *G10L 19/018* (2013.01); *G06F 16/683* (2019.01); *G10L 25/18* (2013.01);
(Continued)

(58) Field of Classification Search
CPC .......... G06F 17/30743; G06F 17/2211; H04H 2201/90; H04L 9/3236; H04L 9/3247; G06K 9/00523; G10L 25/18
See application file for complete search history.

(56) References Cited

U.S. PATENT DOCUMENTS 7,783,889 B2 *  8/2010  Srinivasan ............. H04N 7/173
                                                    380/202
8,094,872 B1 *  1/2012  Yagnik .............. H04N 21/23418
                                                    380/201
(Continued)

FOREIGN PATENT DOCUMENTS

WO      2018226886      12/2018

OTHER PUBLICATIONS

Chiu et al., "Background Music Identification Through Content Filtering and Min-Hash Matching," 2010 IEEE International Conference on Acoustics, Speech and Signal Processing, Mar. 14-19, 2010, 4 pages.
(Continued)

*Primary Examiner* — Thomas H Maung
(74) *Attorney, Agent, or Firm* — Hanley, Flight & Zimmerman, LLC

(57) ABSTRACT

A method for generating a signature is disclosed. As part of the method, a first number of bits are identified in respective rows of an audio signature matrix that are determined to be the strongest bits in the row, bits of the audio signature matrix are replaced with respective cells having values depending on whether the respective bits are included in the first number of bits, a set of uniformly distributed numbers are generated within a range of numbered locations corresponding to cells of the audio signature matrix; numerical distances are determined, from respective numbers in the set of uniformly distributed numbers, to the numbered locations
(Continued)

of the matrix, associated with nearest occurrences of a first value. A set of integers is generated based on the distances.

18 Claims, 14 Drawing Sheets

Related U.S. Application Data continuation of application No. 15/617,722, filed on Jun. 8, 2017, now Pat. No. 10,236,005.

(51) Int. Cl.
  *G10L 25/18*   (2013.01)
  *G06F 16/683*  (2019.01)
  *G10L 25/51*   (2013.01)
  *H04L 9/32*    (2006.01)

(52) U.S. Cl.
  CPC .......... *G10L 25/51* (2013.01); *H04H 2201/90* (2013.01); *H04L 9/3236* (2013.01)

(56) References Cited

U.S. PATENT DOCUMENTS

| | | | |
|---|---|---|---|
| 8,411,977 | B1 | 4/2013 | Baluja et al. |
| 8,447,032 | B1* | 5/2013 | Covell .............. G06F 17/30949 380/28 |
| 8,947,595 | B1* | 2/2015 | Tucker ................. H04N 21/231 348/445 |
| 8,953,811 | B1 | 2/2015 | Sharifi et al. |
| 9,213,703 | B1 | 12/2015 | Postelnicu et al. |
| 9,299,364 | B1 | 3/2016 | Pereira et al. |
| 10,236,005 | B2 | 3/2019 | Srinivasan et al. |
| 10,872,614 | B2 | 12/2020 | Srinivasan et al. |
| 2009/0157391 | A1 | 6/2009 | Bilobrov |
| 2009/0282218 | A1 | 11/2009 | Raichelgauz et al. |
| 2011/0142348 | A1 | 6/2011 | Radhakrishnan et al. |
| 2013/0318096 | A1 | 11/2013 | Cheung |
| 2016/0034452 | A1 | 2/2016 | Ramanathan et al. |
| 2016/0072599 | A1 | 3/2016 | Kariyappa et al. |
| 2016/0249093 | A1* | 8/2016 | Stojancic ................ H04N 1/32 |

OTHER PUBLICATIONS

Wikipedia, "MinHash," retrieved on May 5, 2016, [https://en.wikipedia.org/wiki/MinHash], 5 pages.

Chiu et al., "Fast Min-hashing Indexing and Robust Spatio-temporal Matching for Detecting Video Copies," ACM, 2008, 30 pages.

United States Patent and Trademark Office, "Non-final Office Action," mailed in connection with U.S. Appl. No. 15/617,722, dated Jun. 1, 2018, 6 pages.

United States Patent and Trademark Office, "Notice of Allowance," mailed in connection with U.S. Appl. No. 15/617,722, dated Nov. 1, 2018, 6 pages.

International Searching Authority, "International Search Report," mailed in connection with International Application No. PCT/US2018/036343, dated Sep. 27, 2018, 10 pages.

International Searching Authority, "Written Opinion," mailed in connection with International Application No. PCT/US2018/036343, dated Sep. 27, 2018, 4 pages.

International Bureau, "International Preliminary Report on Patentability," dated Dec. 19, 2019 in connection with International Patent Application No. PCT/US2018/036343, 6 pages.

United States Patent and Trademark Office, "Notice of Allowance," mailed in connection with U.S. Appl. No. 16/355,243, dated Aug. 20, 2020, 5 pages.

United States Patent and Trademark Office, "Non-final Office Action," mailed in connection with U.S. Appl. No. 16/355,243, dated Mar. 30, 2020, 6 pages.

United States Patent and Trademark Office, "Notice of Allowability," mailed in connection with U.S. Appl. No. 16/355,243, dated Oct. 15, 2020, 8 pages.

\* cited by examiner

FIG. 1

METHODS AND APPARATUS FOR AUDIO SIGNATURE GENERATION AND MATCHING

RELATED APPLICATION(S)

This patent arises from a continuation of U.S. patent application Ser. No. 16/355,243, which was filed on Mar. 15, 2019, which is a continuation of U.S. patent application Ser. No. 15/617,722, which was filed on Jun. 8, 2017. The entireties of U.S. patent application Ser. No. 16/355,243 and U.S. patent application Ser. No. 15/617,722 are incorporated herein by reference. Priority to U.S. patent application Ser. No. 16/355,243 and U.S. patent application Ser. No. 15/617,722 is hereby claimed.

FIELD OF THE DISCLOSURE

This disclosure relates generally to audio signatures, and, more particularly, to audio signature generation and matching.

BACKGROUND

A media monitoring system typically includes one or more device meters to monitor the media presented by one or more media devices located at one or more monitored sites. Such a device meter can use watermarks decoded from the presented media and/or signatures (also referred to as media fingerprints or just fingerprints) generated from the presented media, or both, to monitor (e.g., identify and/or track) the media being presented by a media device. For example, identification codes, such as watermarks, ancillary codes, etc., may be transmitted within media signals. Identification codes are data that are transmitted with media (e.g., inserted into the audio, video, or metadata stream of media) to uniquely identify broadcasters and/or the media (e.g., content or advertisements), and/or are associated with the media for another purpose, such as tuning (e.g., packet identifier headers ("PIDs") used for digital broadcasting). Codes are typically extracted using a decoding operation.

In contrast, signatures are a representation of some characteristic of the media signal (e.g., a characteristic of the frequency spectrum of the signal). Signatures can be thought of as fingerprints. They are typically not dependent upon insertion of identification codes in the media but, instead, preferably reflect an inherent characteristic of the media and/or the signal transporting the media. Systems to utilize codes and/or signatures for audience measurement are long known.

When signatures are used for media monitoring, signatures of the monitored media (referred to herein as query signatures) are generated by the device meter and compared to reference signatures representative of reference media known to the media monitoring system. When a match is found, the media corresponding to the query signature(s) being processed can be identified as corresponding to the reference media represented by the matching reference signature(s). In many media monitoring systems, the device meters provide their generated site signatures to a data processing facility or other centralized processing site for comparison with the reference signatures that are representative of the reference media available for presentation at the respective monitored sites. Such comparison may involve comparing large numbers of site signatures with large numbers of reference signatures, especially when the number of monitored sites is large and/or the amount of possible reference media available for consumption is large.

BRIEF DESCRIPTION OF THE DRAWINGS

FIG. 1 shows an example audio signature matrix of 16 columns and 8 rows.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 2:
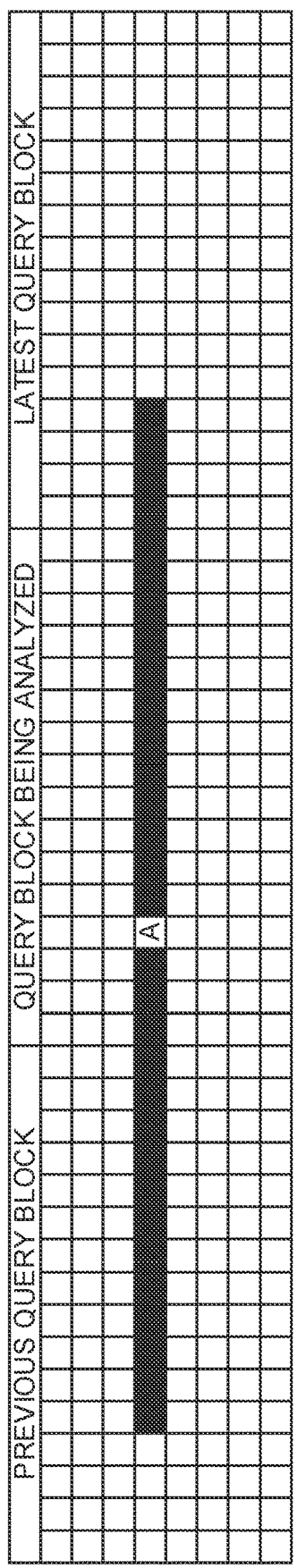
FIG. 2 shows an example match row that includes a block of signatures prior to and a block of signatures subsequent to the block being analyzed.

MINHASH is a technique for determining similarity between pairs of digital datasets. Traditional hash functions can be used to determine if two datasets are identical by comparing their hash values. MINHASH extends this capability to datasets which are very similar but not identical. This approach finds extensive applications in various fields including data mining, image recognition and search algorithms. Some companies have adapted this algorithm for audio content recognition using audio fingerprints (also called signatures).

Audio content recognition utilizes a reference audio signature database against which a query signature can be compared to determine a match. There are commercially available systems such as Shazam™, which can, for example, identify a song. As part of the operation of Shazam, an application running on a device, such as a smart phone, can capture a short duration snippet of audio to which a user is listening. The application derives a signature from the audio and sends it to a remote web based matcher system. At the matcher the signature is processed to determine similarity relative to a large reference database of signatures from thousands of songs. The results of the matching operation are sent to the device from which the query was received.

In many cases, the signatures derived at the device are unlikely to provide an exact match to the signatures stored in the reference database. This is because the audio captured by the microphone is often corrupted by ambient noise, multi-path interference effects and distortion. Also, signatures are generally derived from "blocks" of digital audio samples, and the blocks used at the reference will not align perfectly in time with those compared to the query audio as they are derived from completely independent systems. This prevents the signatures from being identical even if the audio is free from the corrupting factors mentioned above. For these reasons a similarity measure for matching digital fingerprints is appropriate in such situations. MINHASH is suitable for such purposes.

Most audio signature generation algorithms use spectrograms as their base for computation. Spectrograms represent the variation in time of the energy in bands of frequencies present in an audio stream. It is common to limit the frequency bands of interest to the range 300 Hz to 3 kHz where most of the significant energy in an audio stream is present. Some spectral signatures use the sign of the difference in band energy between successive audio blocks to generate a signature bit pattern. One approach uses 371 millisecond long blocks of audio taken at 11.6 millisecond intervals for computing their spectrogram. At a sampling rate of 44.1 kHz this corresponds to a block size of 16384 samples with adjacent blocks shifted relative to each other by 512 samples. These spectrograms are represented as 2 dimensional images with time steps along the X-axis and frequency bands along the Y-axis. In an example, a sequence of such spectrograms spanning a time interval of 1.4 seconds is subjected to a wavelet transformation. The strongest 200 wavelet coefficients, based on magnitude, are retained under the assumption that when fingerprints are computed from the query audio these are most likely to survive the corrupting factors outlined earlier. The wavelet coefficients are further converted to a simple bit pair representation "01" and "10" for negative and positive wavelet coefficients respectively. The weak wavelet coefficients are all set to "00". The result is a sparse "binary image" representation of the 1.4 second audio snippet in which most of the pixels are set to 0. In some examples, the binary image is further converted to a 1-D vector of 8192 bits and of these only 200 are set to "1" as a result of selecting the strongest coefficients. The MINHASH technique encodes this sparse array as a signature by the use of "permutations." For example, 100 pre-computed permutations P1, P2 . . . P100 are applied to this vector. For each permutation the index of the occurrence of the first "1" is recorded as a signature. This is expected to occur at an index whose value is less than 256 because there are 200 "1" bits spread randomly inside the 8192 array. The index can therefore be represented as a byte. The complete fingerprint for the audio snippet consists of 100 bytes—one byte for each permutation. In some examples, such fingerprints are then transformed by a grouping technique called locality sensitive hashing (LSH) into a smaller number of hash tables that can be used in high speed matching.

In accordance with the teachings of this disclosure, the MINHASH technique can be applied in a much simpler fashion to an example audio fingerprint algorithm called NDASH. NDASH consists of a sequence of elemental fingerprints. Each elemental fingerprint consists of 24 bits. Each bit is derived by analyzing a band of frequencies obtained from a DFT (Discrete Fourier Transform) of 4096 audio samples in 8 kHz sampled digital audio with the following equation:

$$D_n = \sum_{k=start}^{k=end} f_{kw1}^2 - f_{kw2}^2$$

This corresponds to 512 milliseconds in the time domain. The time domain audio sample block is multiplied by 2 different "window" functions w1 and w2. In the preceding equation, $f_{kw1}^2$ is the energy of a frequency bin with index k when the block is multiplied by window function w1 and $f_{kw2}^2$ is the energy of the same bin when the block is multiplied by window function w2. The difference between the 2 energies is summed across all the frequency bins in frequency band n to obtain $D_n$. In some examples, there are 24 frequency bands and each consists of 32 consecutive frequency bins. In some examples, the bands encompass the range 1 kHz to 3 kHz. In some examples, the $n^{th}$ bit is set to 1 or 0 depending on whether $D_n$ is greater than or less than 0.

Figure 1:
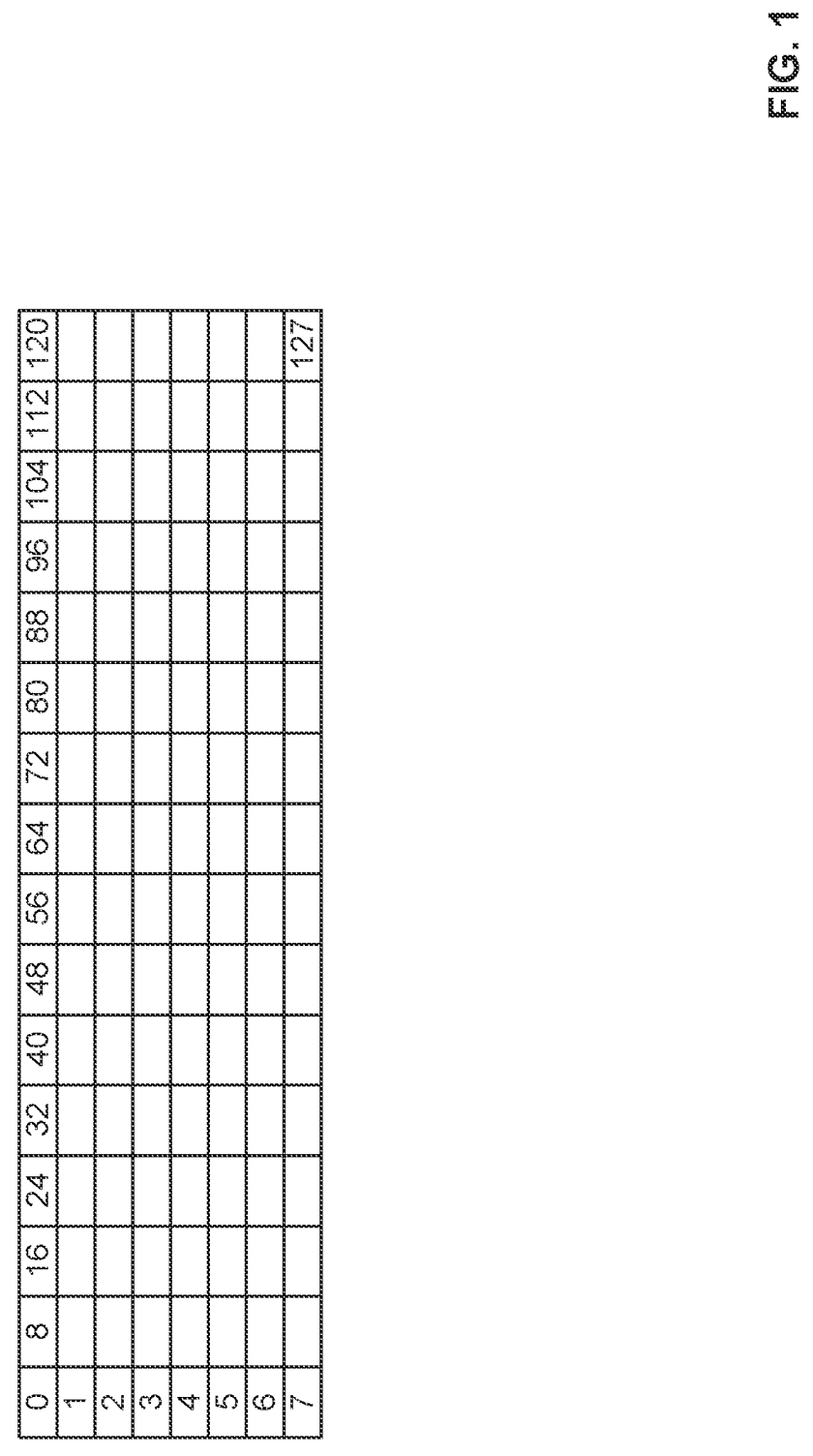

For identifying content using such signatures a sequence of elemental signatures is needed. In some examples, reference signatures are obtained by using a sliding window displaced in time by 16 milliseconds or 128 audio samples. However, for matching, a sequence where consecutive signatures are spaced in time at intervals of 128 milliseconds is used. By taking every $8^{th}$ signature in the original sequence 8 unique "rows" of signatures can be created. For convenience, signatures are converted to packets of 128 elemental signatures and represent 2.048 seconds of audio=128×16 milliseconds. These are then rearranged as a matrix of 16 columns and 8 rows as shown in FIG. 1. This is done because when query signature generation is performed at the QUERY media monitoring sites the audio blocks consisting of 4096 samples will not have boundaries that perfectly time align with the reference blocks. In general, there is no time synchronization between reference and query signatures. Continuing with the above example, the fine spacing in the reference minimizes the block misalignment error between query and reference to ±8 milliseconds. Thus, at least one of the 8 reference rows will be almost perfectly aligned. On a Discrete Fourier Transform computed for a block of samples corresponding to 512 milliseconds in the time domain, the change in spectral coefficients due to a shift of 8 milliseconds will be insignificant.

In some examples, given an unknown sequence of query signature blocks, matching is performed against a reference by comparing a sequence of 32 consecutive signatures in a row, 16 on either side of an anchor signature location, with a similar sequence on the reference. The spacing between elemental signatures in this sequence is 128 milliseconds. This sequence of elemental signatures may be referred to as a match row. To create a match row, a block of signatures is needed prior to and a block of signatures is needed subsequent to the block being analyzed as shown in FIG. 2. As an example of a match row consider one of the cells in the middle block marked "A". In this example, "A" can be regarded as an anchor cell. A sequence of 32 column signatures can be formed with this cell in the middle. The 32 columns span a time duration of 32×128 milliseconds=4.096 seconds. From a query packet of 128 signatures, 128 such sequences or match rows can be created.

An inefficient manner of doing matching ("Brute Force Matching") involves sliding each of the query sequences one cell at a time across the entire reference arranged in the form of 8 rows. After each slide a Hamming distance calculation is performed, e.g., a count of the number of bits out of 32×24=768 bits that do not match one another. If, for example, less than 200 bits out of the 768 bits are not matched, this location is considered a potential match between the reference and query. When multiple such locations are found, the location with the smallest Hamming distance is determined. For a realistic database consisting of thousands of hours of audio content such a matching process will be extremely slow and impractical.

A more practical approach is to use an Inverted Index Table. Such an approach assumes that, in spite of audio at the query being modified by ambient noise, multi-path reflections etc., at least a few of the 24-bit elemental query signatures in a packet of 128 signatures will exactly match the corresponding location in the reference. While building the reference database an inverted index table can be created which identifies for any 24-bit value the different locations inside the reference where that particular 24-bit value was observed. In a realistic case of a reference database representing audio content from 100 television (TV) channels recorded over 8 days, there will be hundreds of such "hits" for each 24-bit value. In such an example, the inverted index table would consist of $2^{24}$=1677216 list structures. Each list contains all the "hits" in the reference associated with the 24-bit value represented by that list. At each of the hit locations, a Hamming distance analysis can then be performed using the exact match location as the anchor cell. This reduces the search by several orders of magnitude and produces results comparable to the brute force matching method in a fraction of the time.

However, Hamming distance is computationally expensive. The 768 bit calculation can be transformed into 12 64-bit operations. For each pair of 64-bit numbers in the reference and query signatures an XOR operation followed by a POPCNT instruction is performed. POPCNT is an assembly code instruction which executes in 1 clock cycle in many modern CPUs. It counts the number of is in the result obtained from the XOR operations and yields the Hamming Distance. For example, a QUAD CORE personal computer (PC) with 3.0 GHZ clock and storing reference signatures for 1536 hours of content, each query packet can be processed in under 1 millisecond by this method. With a cluster of PCs the reference size can be expanded. In some examples, query signature packets are processed in parallel after being propagated by a controller PC to the entire cluster. In some examples, the signature generation and matching system described herein makes use of a signature representation such as the MINHASH representation to generate and match audio signatures.

Figure 3A:
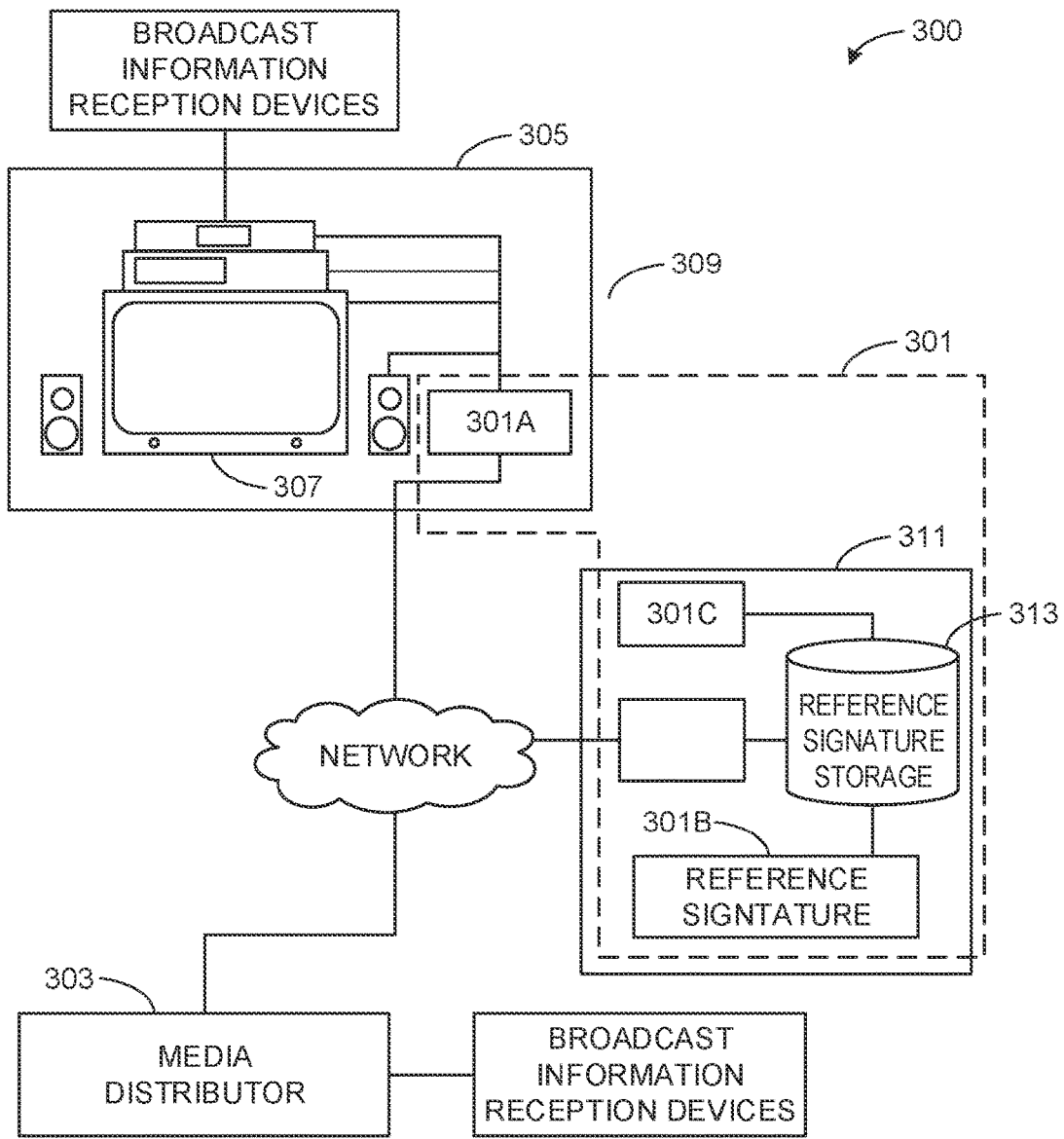
FIG. 3A is a schematic illustration of an example operating environment of a system for audio signature generation and matching in accordance with the teachings of this disclosure.

FIG. 3A is a schematic illustration of an example operating environment 300 of an example system 301 for audio signature generation and matching. The system 301 generates and matches signatures using a methodology for generating and matching signatures that: (1) uses bands of frequencies whose widths change in a logarithmic manner, (2) orders the rows of the signature matrix based on the strength of bits in the rows and (3) encodes a representative vector using a uniformly distributed array of numbers as an index in the vector. The resulting signature can be efficiently stored and enables improved matching speed relative to the conventional methodologies that are described herein. FIG. 3A shows an example media distributor 303, an example monitored site(s) 305, an example media presentation device 307, an example device meter 309, an example media reference site 311, an example reference signature storage 313, an example query signature generator 301a, an example reference signature generator 301b and an example signature matcher 301c. In the FIG. 3A example, system 301 includes the query signature generator 301a, the reference signature generator 301b and the signature matcher 301c.

Referring to FIG. 3A, the example operating environment 300 of FIG. 3A includes one or more example media distributors 303 that distribute media for presentation by media presentation devices 307. The media distributor 303 can include any type of media distributor, such as a television station, a cable network, a satellite network (e.g., television or radio), a radio station, a streaming media service (e.g., such as Hulu™ Netflix®, etc.), etc. As such, the media distributed by the media distributor 303 can correspond to any type of media, such as television programming, radio programming, multimedia (e.g., audio and/ or visual) data, etc. In the illustrated example, the media distributor 303 can distribute a particular piece of media (e.g., such as a particular television program, a particular radio program, a particular movie, etc.) to recipients (e.g., television viewers, radio listeners, computer users, electronic device users, etc.) via one or more distribution media (e.g., such as one or more radio frequency, cable and/or satellite television and/or radio channels, one or more networks carrying one or more digital transport channels, etc.). In some examples, the media distributor 303 provides the media that the query signature generator 301a uses to generate query signatures. In addition, the media distributor 303 provides the media that the reference signature generator 301b uses to generate the reference signatures. In some examples, signature matcher 301c compares the query and reference signatures in order to identify media that is being presented by media presentation device.

The media reference site 311 monitors media distributions by some or all of the media distributors 303. In some examples, the media reference site 311 is located separately from monitored site 305 (as shown in FIG. 3A). In other examples, the media reference site 311 is located at the monitored site 305. In one example, the media reference site 311 includes the reference signature generator 301b and the signature matcher 301c. In some examples, the media reference site 311 determines via signature generator 301b reference signatures for media distributions that can potentially be received by monitored site 305. In some example, the media reference site 311 associates the media identification information with the reference signatures.

The reference signature generator 301b generates reference signatures based on the media distributions that are accessed by the reference site 311. The reference signatures correspond to media that could be received by the monitored site 305. For each media distribution monitored by the reference signature generator 301b, the reference signature generator 301b generates respective reference signatures and associates media identification information with the reference signatures. The reference signatures and associated media identification information can then be stored in reference signature storage 313.

Figure 3B:
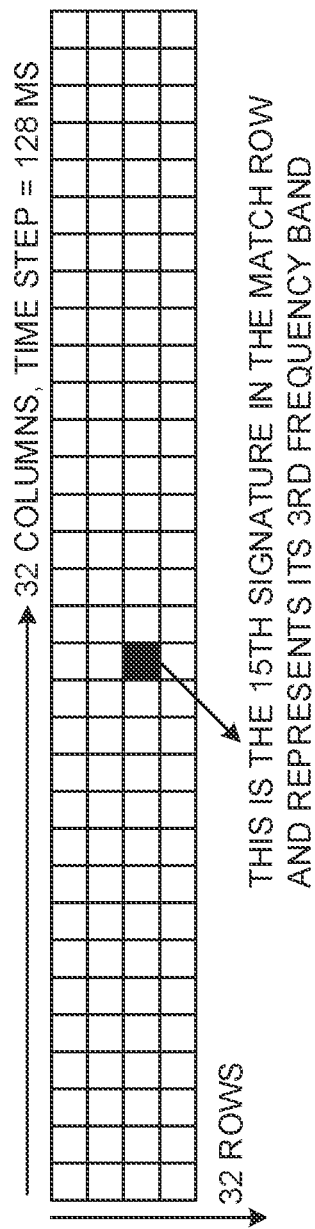
FIG. 3B shows an example matrix that can be used to generate an audio signature in accordance with the teachings of this disclosure.

In one example, reference signature generator 301b generates reference signatures using a similarity measure fingerprint generation approach. In one example, the reference signatures are constructed by identifying strong bits in a fingerprint matrix. FIG. 3B shows an example signature matrix. In some examples, a wavelet transform is used to select strong coefficients. In other examples, other suitable ways of selecting strong coefficients can be used. In some examples, $D_n^2$ from the equation above, which is a positive number, is used as an indicator of which bits are strong. In other examples, other suitable ways of determining strong bits can be used. In some examples, frequency bands are defined by an extension of the spectral range, relative to some conventional approaches, by 310 Hz to 2.5 kHz. In some examples, the width of the bands is caused to change in a "logarithmic" fashion (because energy of audio falls at higher frequencies). In other examples, frequency bands can be defined to have other characteristics. In some examples, the bands representing the higher frequencies can have more bins than lower frequency bins as a part of 32 bands having approximately the same energy. In other examples, other numbers of bands can be used. In some examples, 32 consecutive signatures of a match row are treated as a 32×32 matrix, where each column represents the 32 bands of an elemental signature and each row indicates how a particular band behaves with respect to time (FIG. 3B). In order to generate a sparse array, each row of this matrix is sorted based on the strength $D_n^2$ of the bits in that row and the three strongest are retained. Depending on the sign of $D_n$ either 10 or 01 is assigned to these selected strong cells. The other cells are set to 00. This provides a 32 row×64 column binary data matrix in which 96 bits are set to "1". In some examples, by selecting 3 of the strongest bits in each row, equal representation is provided to each of the 32 frequency bands. In one example, the 32 rows of the matrix are concatenated to create a single 2048-bit vector. In other examples, vectors of other lengths can be created.

In some examples, the sparsely distributed "1" bits in the vector are encoded. In some examples, the logical 1 bits are encoded using a uniformly distributed array of 46 numbers in the range 60 to 1980. In other examples, other numbers in other ranges can be used. In some examples, two more numbers 0 and 1983 are added to the set of 46 numbers to create 48 entries as follows:

{0, 258, 1882, 891, 850, 491, 929, 1112, 462, 1468, 1381, 369, 178, 1041, 1060, 1329, 1969, 1625, 524, 242, 669, 1692, 1310, 635, 568, 1523, 472, 1335, 246, 1925, 75, 1940, 1097, 451, 1532, 589, 1321, 1332, 1011, 1636, 540, 521, 1804, 1340, 1763, 307, 1284, 1983}

In some examples, each of these entries is used as a starting index in the 2048-bit vector, and the distance is measured relative to these indexes to the first occurrence of a bit having a value of logical "1". Thus, a set of 48 integers is provided and this is an overall representation for an entire row covering 4.096 seconds. In some examples, each of these integers is less than 64 in value because there are 96 bits set to "1" distributed across the 2048 length of the vector. Accordingly, a 6-bit representation for each of these integers is provided.

Figure 3C:
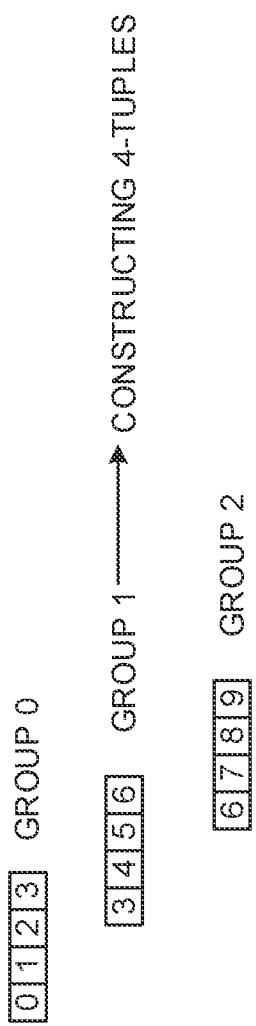
FIG. 3C shows example tuple groupings in accordance with the teachings of this disclosure.

In some examples, an inverted index table can be constructed based on the set of 48 6-bit integers. For example, successive 4-tuples of these 6-bit numbers are grouped to create a 24-bit look up table entry. The groupings are constituted based on a shift of three 6-bit numbers as shown in FIG. 3C. When the end of the array is reached, the shift continues from the beginning to determine the final 4-tuple value. In some examples, in this manner 16 potential inverted index table look up opportunities are determined for each "matcher row" representation. In addition, the 48-integer set can be stored as a vector for detailed matching. The look up table entry will contain a list of pointers to all the 48-integer sets with this 24-bit value and its associated group index.

Figure 3D:
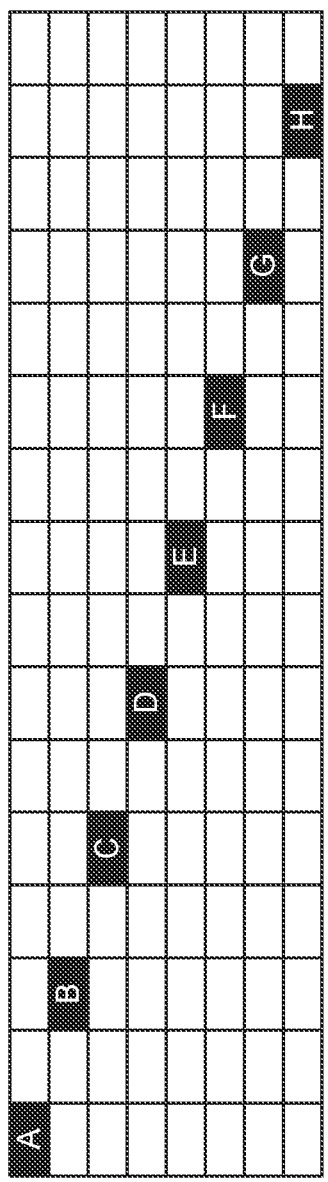
FIG. 3D shows an example staggered diagonal array of 8 anchor cells in accordance with teachings of this disclosure.

In some examples, a single row of 32 consecutive signatures used in matching can be converted to a MINHASH representation and then, for purposes of matching, to an inverted index table format. In some examples, matching is based on a single anchor cell. In some examples, there can be 128 elemental signatures in a packet and each one of them can be used as an anchor cell. However, such an approach can lead to excessive reference signature data. Accordingly, in one example, a staggered diagonal array of 8 anchor cells marked A, B, C, D, E, F, G, H as shown FIG. 3D can be used. In one example, this approach limits excessive signature data. In some examples, using this approach, 8 sets of 48 integer arrays are generated for each packet. In some examples, the staggered diagonal array that is produced takes into account all the cells in a packet.

In some examples, the reference signature thus generated can be stored in reference signature storage 313 from which it may be accessed by the signature comparer 301c Referring again to FIG. 3C, the signature comparer 301c compares query signatures (described in detail herein below) to the reference signatures to determine if they match. In some examples, the query signatures are obtained from the query signature generator 301a after being generated at the monitored site 305. In one example, the reference signatures are obtained from the reference signature generator 101a.

In some examples, in the comparison of query signatures to reference signatures, a query packet, like a reference packet, is represented by 8, 48-integer valued vectors. In other examples, other numbers of integer valued vectors and numbers of integers can be used. In some examples, a grouping similar to that in FIG. 3C can be performed to create 16 inverted index table look up 24-bit integers. Each look up operation can yield several locations where this particular 24-bit valued grouping was present in the reference. However, in one example, hits that have a group index that is the same as the group index in the query are selected for detailed analysis. For example, if the $5^{th}$ 4-tuple from the query is used, then, just those locations in the reference where the group index on the reference is also the $5^{th}$ 4-tuple, are extracted from the "hits" list. At the extracted location an integer-to-integer comparison is done between the 48 numbers of the reference and the 48 numbers of the query. In one example, if there are less than 24 mismatches, a valid recognition is determined.

The monitored site 305 is a location where the presentation and consumption of media is monitored. In some examples, the monitored site 305 can include the presentation device 307 and the query signature generator 301a. In some examples, the media that is presented by the presentation device 307 is received from media distributor 303. In one example, monitored site 305 can correspond to one or more panelists selected (e.g., statistically) for inclusion in an audience measurement panel, media monitoring survey, etc. Each monitored site 305 includes one or more media presentation devices 307 to present the media received at the monitored site.

The media presentation device 307 (also referred to herein as a media device 307) presents media received from the distributer 303. The media presentation device 307 can include any type of media device, such as, but not limited to, a set-top box, a television, a radio, a multimedia computer system, tablet computer, a portable digital assistant, a cellular/mobile smartphone, etc.

In some examples, the query signature generator 301*a* generates a signature corresponding to the media presented in the monitored environment 300. In some examples, the query signature generator receives audio signals obtained from the media presentation device 307 via a microphone and/or other audio sensor(s), and/or via a direct cable connection, and generates query signatures that are representative of the media being presented by the media presentation device 307. In some examples, the query signatures generated by the query signature generator 301*a* are compared with known reference signatures to identify/monitor the media being presented by the media presentation device 307. In some examples, the media signature generator 301*a* can be a part of a device meter 309 as described herein in detail.

As used herein, a query signature is a representation of some characteristic of the media signal (e.g., a characteristic of the frequency spectrum of the signal) which can be used to identify the signal, and can be thought of as a fingerprint. In some example, signatures are typically not dependent upon insertion of identification codes in the media, but instead preferably reflect an inherent characteristic of the media and/or the signal transporting the media.

In some examples, the query signature generator 301*a* generates query signatures in a manner similar to that used to generate reference packets. For example, a query packet, like a reference packet, can be represented by 8, 48-integer valued vectors. In one example, a grouping similar to that in FIG. 3C can be performed to create 16 inverted index table look up 24-bit integers. Each look up operation can yield several locations where this particular 24-bit valued grouping was present in the reference. However, in one example, hits that have a group index that is the same as the group index in the query are selected for detailed analysis.

Examples disclosed herein improve upon a computationally expensive Hamming Distance calculation by using straightforward integer matching. Another advantage of examples disclosed herein is that the individual integers of the vector representing a match row are obtained via a random traverse through the 2048 long array. This makes each 4-tuple unique and reduces the number of false "hits". In some examples, by analyzing a large variety of audio with a total duration exceeding 1000 hours, it can be determined that certain 4-tuple values associated with certain group indexes occur extremely frequently and may result in false matches. In some example, these values can be eliminated from the inverted index table.

Various comparison criteria, such as a cross-correlation value, a Hamming distance, population (POP) count, etc., can be evaluated to determine whether a query signature (or block of query signatures) matches a particular reference signature (or block of reference signatures). When a match between the query signature(s) and one of (or a block of) the reference signatures is found, the monitored media represented by the query signature(s) can be identified as corresponding to the particular reference media represented by the reference signature(s) that matched the query signature(s).

As mentioned, in some examples, the query signature generator 301*a* can be included as a part of a device meter 309. In one example, the device meter 309 monitors the media presented by the media presentation device(s) 307. For example, a device meter 309 at a particular monitored site 305 can determine metering data that may identify and/or be used to identify media presented by a media device (and, thus, infer media exposure) at monitored site 305. In some examples, the monitored site 305 can also include a people meter to determine audience identification data (also referred to as demographic data, people meter data, etc.) identifying the audience members (e.g., panelists) being exposed to the monitored media, and/or in the vicinity of the monitored media device, etc. In such examples, the device meter combines the metering data with the audience identification data to determine audience measurement data characterizing media exposure at the monitored site 305. The device meter can then store and report the metering data (or audience measurement data).

Operation

Figure 4A:
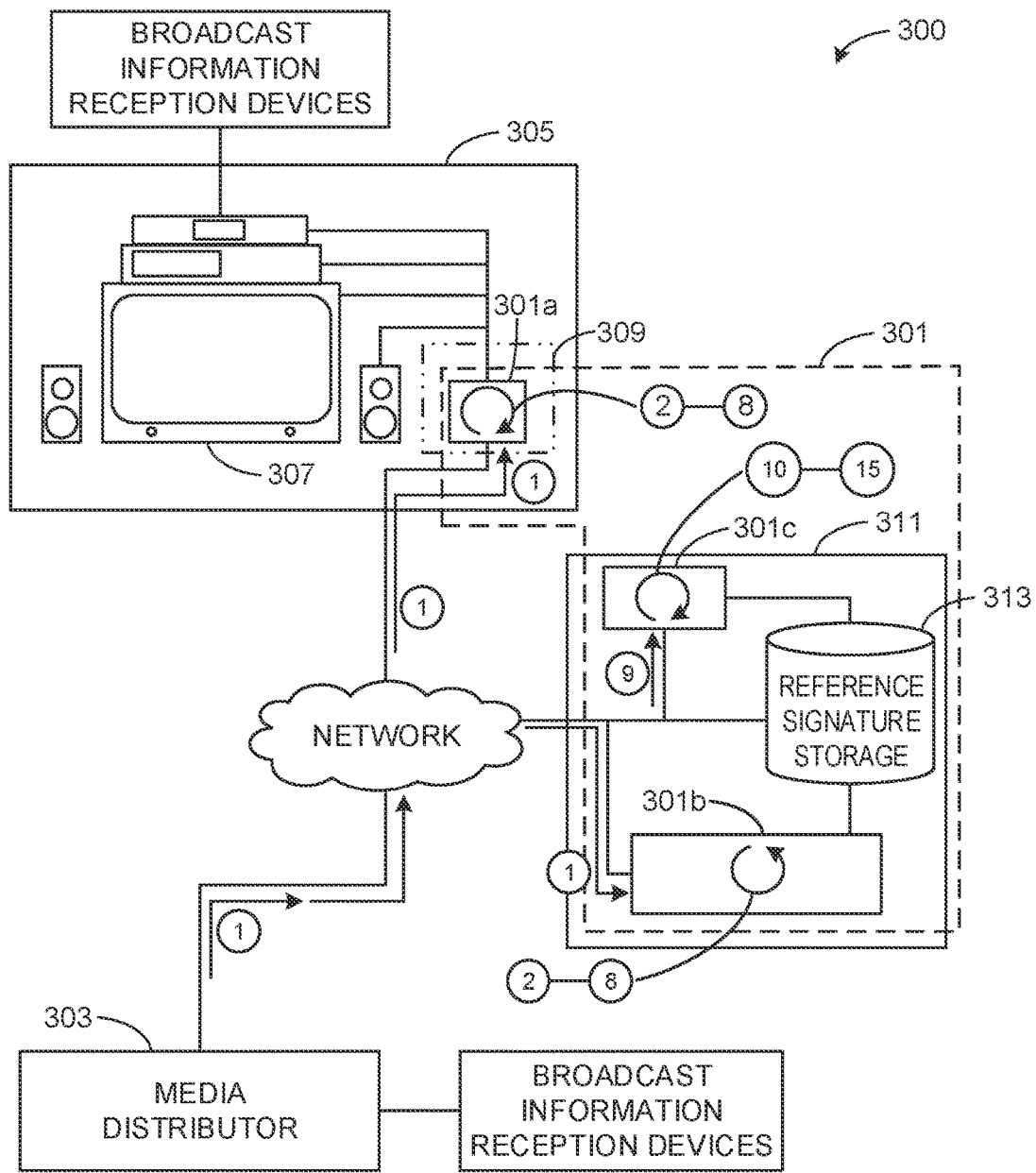
FIG. 4A illustrates example operations performed by a system for audio signature generation and matching in accordance with the teachings of this disclosure.
Figure 4B:
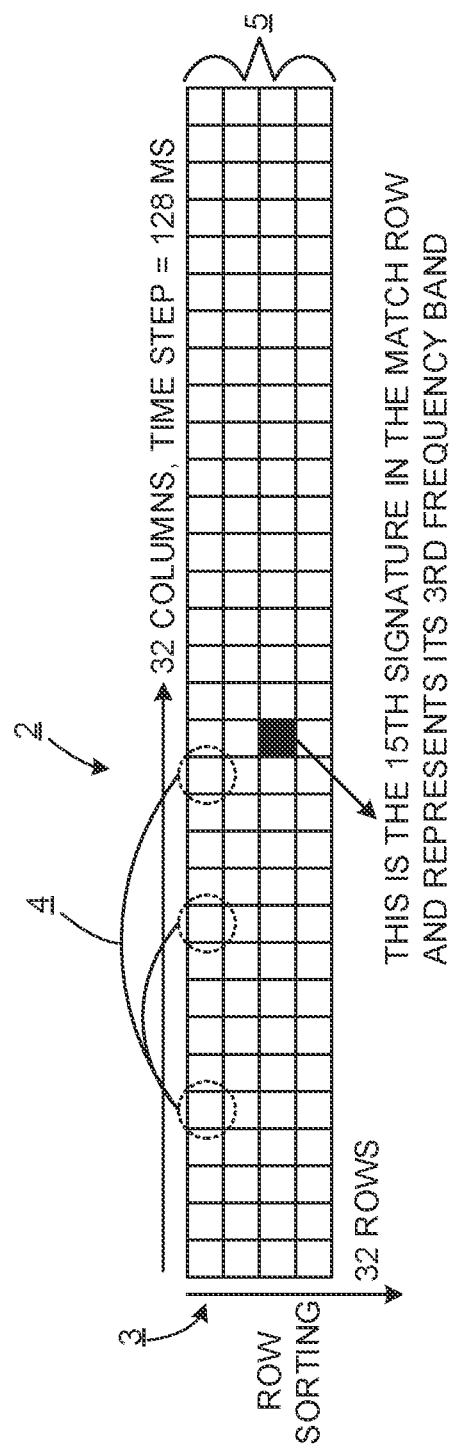
FIG. 4B shows example operations performed as a part of identifying strong bits in a signature matrix in accordance with the teachings of this disclosure.
Figure 4C:
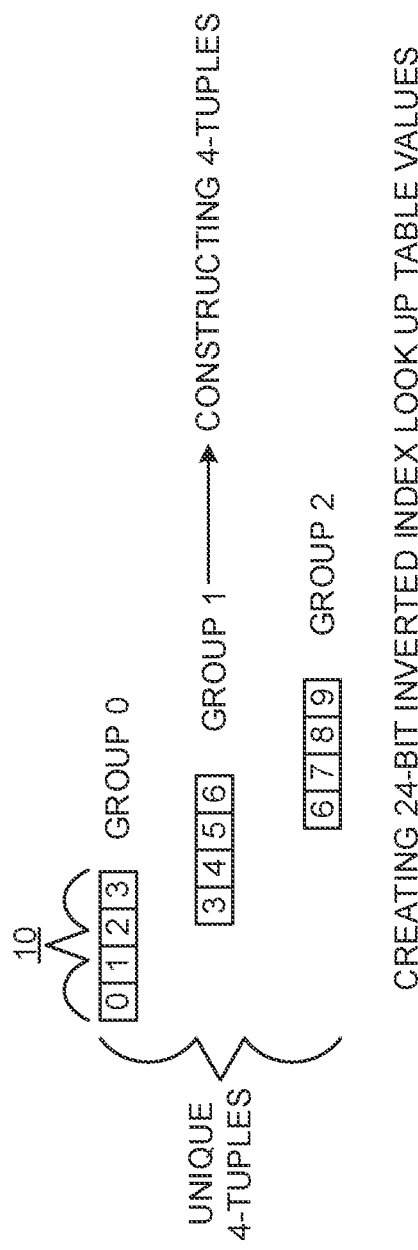
FIG. 4C shows operations performed to generate an inverted lookup table in accordance with the teachings of this disclosure.

FIGS. 4A-4C illustrate example operations performed by the example system 301 for audio signature generation and matching in accordance with the teachings of this disclosure. These operations, which relate to audio signature generation and matching, are only examples. It should be appreciated that other operations that are not illustrated in FIGS. 4A-4C can be performed in accordance with the teachings of this disclosure. In addition, some operations that are illustrated in FIGS. 4A-4C may not be performed in some examples.

Signature Generation

Referring to FIG. 4A, at the example operation labelled 1, media that is distributed by the distributor 303 is received at the reference site 311 and at the monitored site 305. In addition, audio associated with the media is received by the query signature generator 301*a*. In some examples, the media is received at the reference site 311 and at the monitored site 305 at different times. In some examples, the media is received at the reference site 311 before the media is received at the monitored site 305. In other examples, the media is received at reference site after the media is received at the monitored site 305. In other examples, the media is received at the reference site 311 at or about the same time as the media that is received at the monitored site 305. In some examples, the media that is received at reference site 311 may be a part of a large amount of media that is distributed by the distributor 303 from which a database of signatures can be collected at the reference site 311.

At the example operation labelled 2, the reference signature generator 301*b* and the query signature generator 301*a* generate a first audio signature matrix for received audio generated based on a similarity determining audio signature generation algorithm. In one example, the audio signature matrix is based on an NDASH signature generation approach. In other examples, the audio signature is based on another similarity determining audio signature generation approach. See FIG. 4B showing an audio signature matrix according to one example.

At the example operation labelled 3, reference signature generator 301*b* and the query signature generator 301*a* sort each row of the audio signature matrix (that includes rows and columns) based on a determined strength of the bits that are located in that row. In one example, the strength is based on $D_n^2$ of the equation described above. In other examples, other measures of strength can be used. In one example, $D_n$ is the sum of the differences in energy between windows associated with a bin of frequency band n. See FIG. 4B showing the sorting of rows according to strength of bits.

At the example operation labelled 4, the reference signature generator 301*b* and the query signature generator 301*a* identify a predetermined number of bits in each row of the matrix are as the strongest bits in that row for purposes of forming a sparse array with identified strong bits. In one example, three bits are identified as the strongest bits in each row. In other examples, other numbers of bits can be identified as the strongest bits in each row. In some examples, the predetermined number of bits in each row of the matrix that are identified as the strongest bits in that row provide equal representation to the 32 frequency bands of the audio. The bits thus identified are used to generate an audio signature that corresponds to the audio received at operation 1. In some examples, the audio signature array is more sparse than some conventional audio signature arrays. See FIG. 4B showing the identification of strong bits in a row of the signature array.

At example operation labelled 5, the reference signature generator 301b and the query signature generator 301a generate a vector that corresponds to the cells of the matrix. In one example, the vector is formed by concatenating the rows of the matrix. In one example, the rows of the matrix are concatenated to form a 2048-bit vector. In other examples, the rows of the matrix are concatenated to form a vector having another number of bits. FIG. 4B shows that the vector is representative of the entire signature matrix.

Referring to FIG. 4A, at example operation labelled 6, the reference signature generator 301b and the query signature generator 301a generate a set of uniformly distributed numbers within a range of numbers corresponding to cells of the matrix (see example uniformly distributed numbers shown and described herein above). In some examples, the set of uniformly distributed numbers are generated to encode the distributed "1" bits of the vector. In one example, a uniformly distributed set of 46 numbers in the range of 60 to 1980 is generated. In some examples, other numbers of uniformly distributed numbers can be generated. In some examples, uniformly distributed arrays of any suitable size, with numbers in other suitable ranges are used.

At example operation labelled 7 (FIG. 4A), the reference signature generator 301b and the query signature generator 301a determines a numerical distance from each number in the set of uniformly distributed numbers, to a numbered location of the matrix that is associated with the nearest bit set to one (see example uniformly distributed numbers shown and described herein above). For example, each number in the set of uniformly distributed numbers is used as a starting index in a vector, from which to measure the distance to the first occurrence of a bit "1".

At example operation labelled 8 (FIG. 4A), reference the signature generator 301b and the query signature generator 301a generate a set of integers based on the distance. In one example, based on a 2048-bit vector, a set of 48 integers is generated. In other examples, other numbers of integers are generated. In one example, the set of 48 integers represents an entire row covering the 4.096 seconds. In one example, a 6-bit representation of each of the integers is generated.

Signature Matching

Referring to FIG. 4A, at the example operation labelled 9, a query signature is received by the signature matcher 301c from the monitored site 305. In some examples, the query signature is generated using a methodology that is similar to the methodology used to generate reference signatures. In other examples, the query signature can be received by a signature matcher that resides at the monitored site 305.

At the example operation labelled 10 (FIGS. 4A and 4C), signature matcher 301c constructs four tuple groupings are from the query packet. In some examples, four successive tuples of 6 bit numbers are grouped to create 24 bit look up table entries. In other examples, other groupings can be constructed from a query packet. See FIG. 4C that shows the manner in which the tuples are grouped to create entries.

At the example operation labelled 11 (FIG. 4A), the signature matcher 301c identifies hits based on entries in an inverted index table (e.g., tuples from FIG. 4C). In some examples, a hit is determined in a reference signature if a reference signature entry has a group index that is the same as the group index in the query signature.

At the example operation labelled 12 (FIG. 4A), the signature matcher 301c filters out hits that do not correspond to the same permutation group. For example, if the $5^{th}$ 4-tuple from the query is used then only those locations in the reference where the group index on the reference is also the 5th 4-tuple are extracted from the "hits". See FIG. 4C groupings that define permutation groups.

At the example operation labelled 13 (FIG. 4A), the signature matcher 301c compares each byte of the query packet is to each byte of a reference packet across a predetermined number of bytes. At the extracted location, an integer-to-integer comparison is performed between the 48 numbers of the reference and the 48 numbers of the query. In other examples, other numbers of integer to integer comparisons can be used.

At the example operation labelled 14 (FIG. 4A), the signature matcher 301c determines a potential match if there are less than a predetermined number of errors. In some examples, a potential match is determined, if there are less than 24 mismatches. Thus, in some examples, less than 24 mismatches indicate a valid recognition. In other examples, other thresholds indicate a valid recognition. In some examples, the above described integer matching is used instead of the computationally expensive Hamming Distance calculations. Additionally, because individual integers of the vector representing a match row are obtained via a random traverse through the 2048 long similarity measure based array (e.g., MINHASH), each 4-tuple (see FIG. 4C) is fairly unique and the number of false "hits" is reduced.

At the example operation labelled 15 (FIG. 4A), signature matcher 301c validates the match with a subsequent packet. By analyzing a large variety of audio with a total duration exceeding 1000 hours it has been determined that certain 4-tuple values associated with certain group indexes occur extremely frequently and may result in false matches. In some examples, these 4-tuple values are eliminated from the inverted index table. For example, see FIG. 4C where 4-tuple from group 2 is eliminated as being a risk for false matches.

In some examples, the herein described algorithm that represents each 4.096 second snippet of audio as 8 sets of 48 6-bit integers is not only efficient in terms of storage, but also increases the speed of matching by a factor of 20 relative to one conventional method where 128 elemental 24-bit signatures are stored in each packet. The conventional method had 128×3=384 bytes of signature data in each packet. In some examples, 288 bytes of signature data can be present in each packet. In other examples, another amount of signature data can be present in each packet. Examples are fast because of the lack of the use of Hamming Distance computation and the number of locations to explore is reduced significantly due to the MINHASH representation. There are also fewer false positive matches because the strongest bits are used to characterize each frequency band. In some examples, as regards query signatures, there is the flexibility of generating signature packets identical to reference packets, or much coarser than such. It has been determined that a single set of 48 integers on the query side is adequate to provide recognition under reasonably good audio capture conditions.

Figure 5:
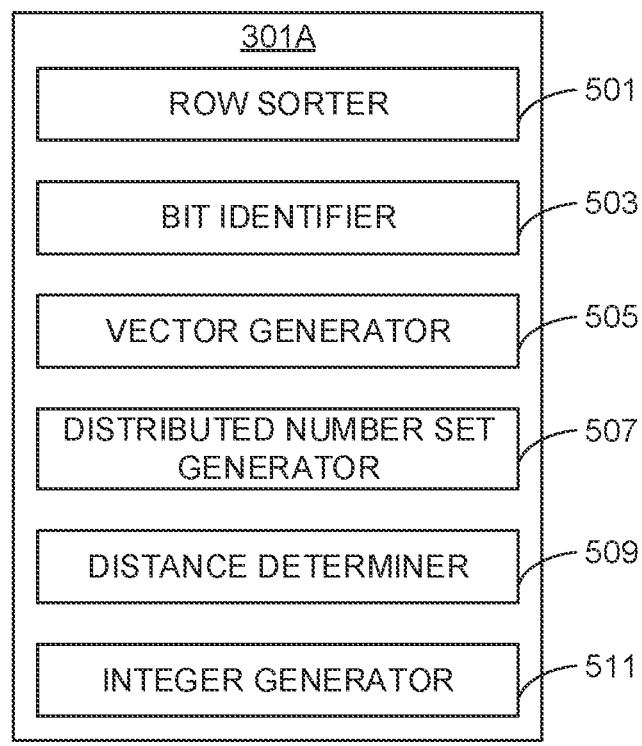
FIG. 5 shows example components of a system for audio signature generation and matching.
Figure 6:
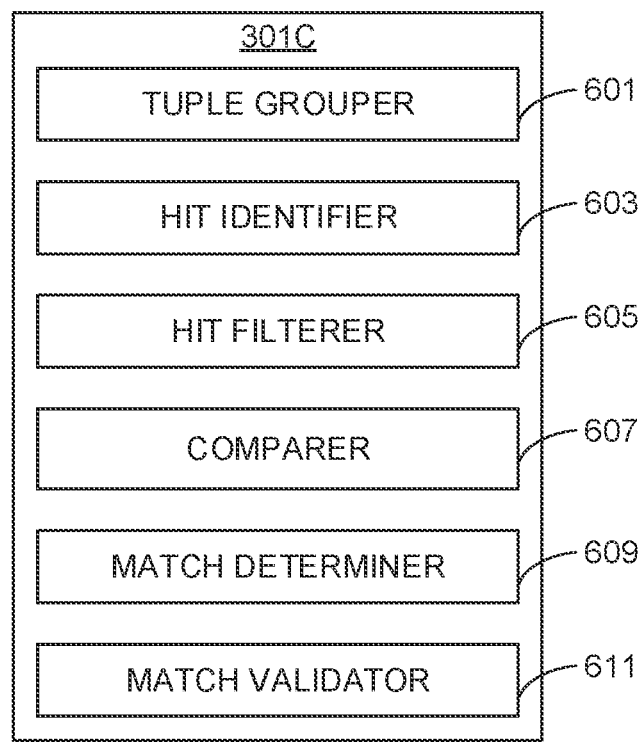
FIG. 6 shows example components of a system for audio signature generation and matching.

FIGS. 5 and 6 show example components of the example audio signature generation and matching system 301. Components of the system 301 implement an example algorithm for audio signature generation and matching. FIG. 5 shows components of the audio signature generator 301a of the system 301. In some examples, the example audio signature generator 301a implements an example algorithm for audio signature generation. The example audio signature generator 301a of FIG. 5 includes an example row sorter 501, an example bit identifier 503, an example vector generator 505, an example distributed number set generator 507, an example distance determiner 509 and an example integer generator 511.

The row sorter 501 sorts the rows of an audio signature matrix based on a determined strength of the bits that are located in the rows (as described herein in detail). In one example, based on the determined strength of the bits that are located in the rows three rows are retained. In other examples, other numbers of rows are retained.

The bit identifier 503 identifies a predetermined number of bits in each row of the matrix as the strongest bits in that row. In one example, three bits are identified as the strongest bits in each row. In other examples, other numbers of bits are identified as the strongest bits in each row. In one example, the predetermined number of bits in each row of the matrix that are identified as the strongest bits in that row provide equal representation to the 32 frequency bands of a signature.

The vector generator 505 generates a vector that corresponds to the cells of a signature matrix. In some examples, the vector is formed by concatenating the rows of the matrix. In some examples, the rows of the matrix are concatenated to form a 2048-bit vector. In other examples, the rows of the matrix are concatenated to form a vector having another number of bits.

The distributed number set generator 507 generates a set of uniformly distributed numbers within a range of numbers corresponding to cells of the matrix. In some examples, the set of uniformly distributed numbers are generated to encode the distributed "1" bits of the vector. In one example, a uniformly distributed array of 46 numbers in the range of 60 to 1980 is generated. In another embodiment, uniformly distributed arrays of any suitable size, with numbers in other suitable ranges are used.

The distance determiner 509 determines a numerical distance from each number in the set of uniformly distributed numbers, to a numbered location of the matrix that is associated with a nearest occurrence of a bit set to one. For example, each number in the set of uniformly distributed numbers is used as a starting index in a vector, from which to measure the distance to the first occurrence of a bit "1".

The integer generator 511 generates a set of integers based on the distance determined by distance determiner. In one example, based on a 2048-bit vector, a set of 48 integers is generated. In other examples, other numbers of integers can be generated. In one example, the set of 48 integers represents an entire row covering the 4.096 seconds. In one example, a 6-bit representation of each of the integers is generated.

FIG. 6 shows example components of an implementation of a signature matcher 301c. The example signature matcher 301c of FIG. 6 shows an example tuple grouper 601, an example hit identifier 603, an example hit filterer 605, an example comparer 607 and an example match determiner 609 and an example match validator 611.

The tuple grouper 601 identifies successive four tuple groups from a vector that is formed based on the integer distance from randomly distributed numbers in an array to ones in the vector. In some examples, four successive tuples of 6 bit numbers are grouped to create a 24 bit look up table entry. In other examples, other numbers of tuples and bit numbers can be used.

The hit identifier 603 identifies hits based on entries in an inverted index table. In some examples, hit identifier 603 identifies a hit in a reference signature if a reference signature entry has a group index that is the same as the group index in the query signature.

The hit filterer 605 filters out hits that do not correspond to the same permutation group. For example, if the $5^{th}$ 4-tuple from the query is used then hit filter 605 would only extract as hits those locations in the reference where the group index is also the $5^{th}$ 4-tuple.

The comparer 607 compares each byte of the query packet to each byte of a reference packet across a predetermined number of bytes. At the extracted location an integer-to-integer comparison is between the numbers of the reference and the numbers of the query.

The match determiner 609 determines a potential match if there are less than a predetermined number of errors. In some examples, a potential match is declared, if there are less than 24 mismatches. In some examples, such a result indicates a valid recognition. In some examples, the computationally expensive Hamming Distance calculation is replaced by an integer matching approach. Another feature of one example is that the individual integers of the vector representing a match row are obtained via a random traverse through the 2048 long array (MINHASH array). This makes each 4-tuple fairly unique and reduces the number of false "hits".

The match validator 611 validates the match that is determined by the match determiner 611 with a subsequent packet.

By analyzing a large variety of audio with a total duration exceeding 1000 hours it is understood that certain 4-tuple values associated with certain group indexes occur extremely frequently and may result in false matches. In other examples, other audio analyzing thresholds can be used. In some examples, the certain group indexes that occur extremely frequently can be eliminated from the inverted index table.

The method described herein that represents each 4.096 second snippet of audio as 8 sets of 48 6-bit integers is not only efficient in terms of storage, but also increases the speed of matching by a factor of 20 relative to the original method where 128 elemental 24-bit signatures are stored in each packet. Conventional NDASH had 128×3=384 bytes of signature data in each packet. Examples described herein can involve 288 bytes. It is fast because it does not involve Hamming Distance computation and the number of locations to explore is reduced significantly due to the MIN-HASH representation. In addition, examples provide fewer false positive matches because the strongest bits have been selected to characterize each frequency band. On the query side there is the flexibility to generate signature packets that are identical to reference packets or on a much coarser basis. In one example, even a single set of 48 integers on the query side is adequate to provide recognition under reasonably good audio capture conditions.

While an example manner of implementing the audio signature generation and matching system 301 of FIG. 3A is illustrated in FIGS. 5 and 6, one or more of the elements, processes and/or devices illustrated in FIGS. 5 and 6 may be combined, divided, re-arranged, omitted, eliminated and/or implemented in any other way. Further, the example row sorter 501, bit identifier 503, vector generator 505, distributed number set generator 507, distance determiner 509 and integer generator 511 and/or, more generally, the example audio signature generation and matching system 301 of FIG. 3A may be implemented by hardware, software, firmware and/or any combination of hardware, software and/or firmware. Thus, for example, any of the example row sorter 501, bit identifier 503, vector generator 505, distributed number set generator 507, distance determiner 509, integer generator 511, tuple grouper 601, hit identifier 603, hit filterer 605, comparer 607, match determiner 609 and match validator 611. and/or, more generally, the example audio signature generation and matching system 301 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, row sorter 501, bit identifier 503, vector generator 505, distributed number set generator 507, distance determiner 509, integer generator 511, tuple grouper 601, hit identifier 603, hit filterer 605, comparer 607 and match determiner 609 and match validator 611, is/are hereby expressly defined to include a tangible computer readable storage device or storage disk such as a memory, a digital versatile disk (DVD), a compact disk (CD), a Blu-ray disk, etc. storing the software and/or firmware. Further still, the example audio signature generation and matching system 301 of FIG. 3A may include one or more elements, processes and/or devices in addition to, or instead of, those illustrated in FIGS. 5 and 6, and/or may include more than one of any or all of the illustrated elements, processes and devices.

Figure 7:
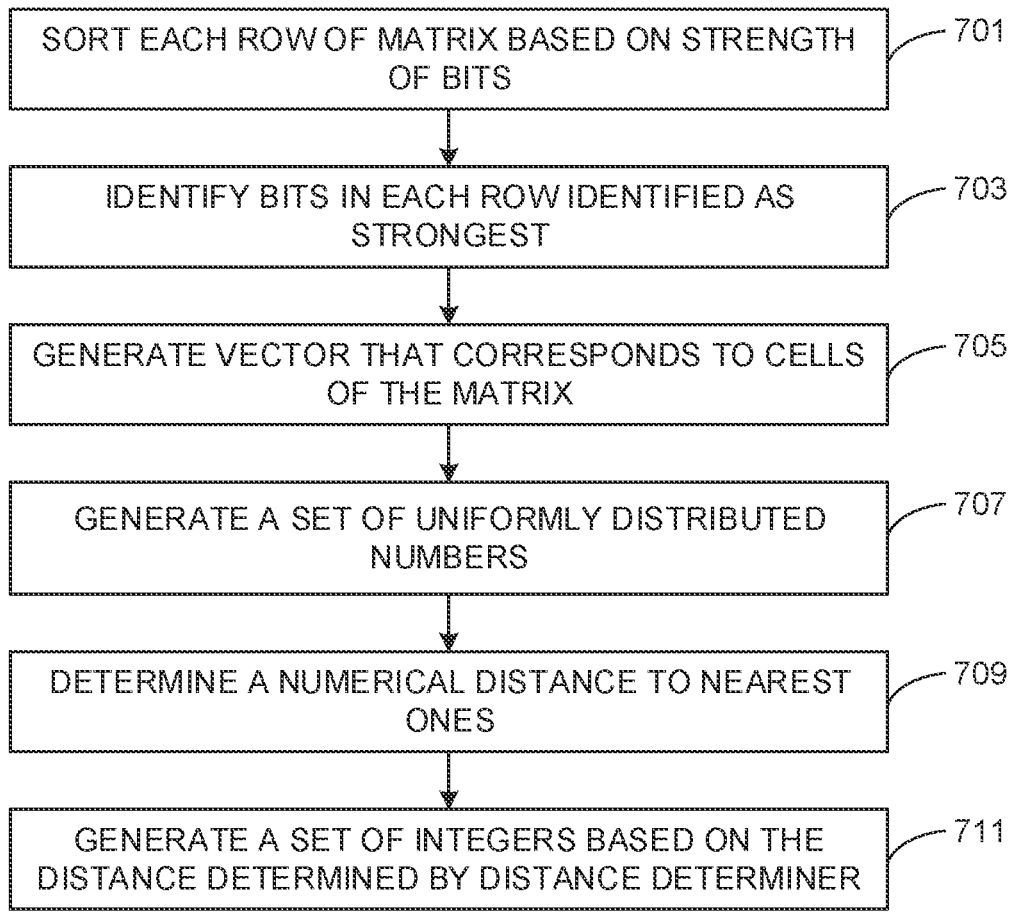
FIG. 7 shows a flowchart representative of example machine readable instructions for implementing the apparatus of FIG. 3A.
Figure 8:
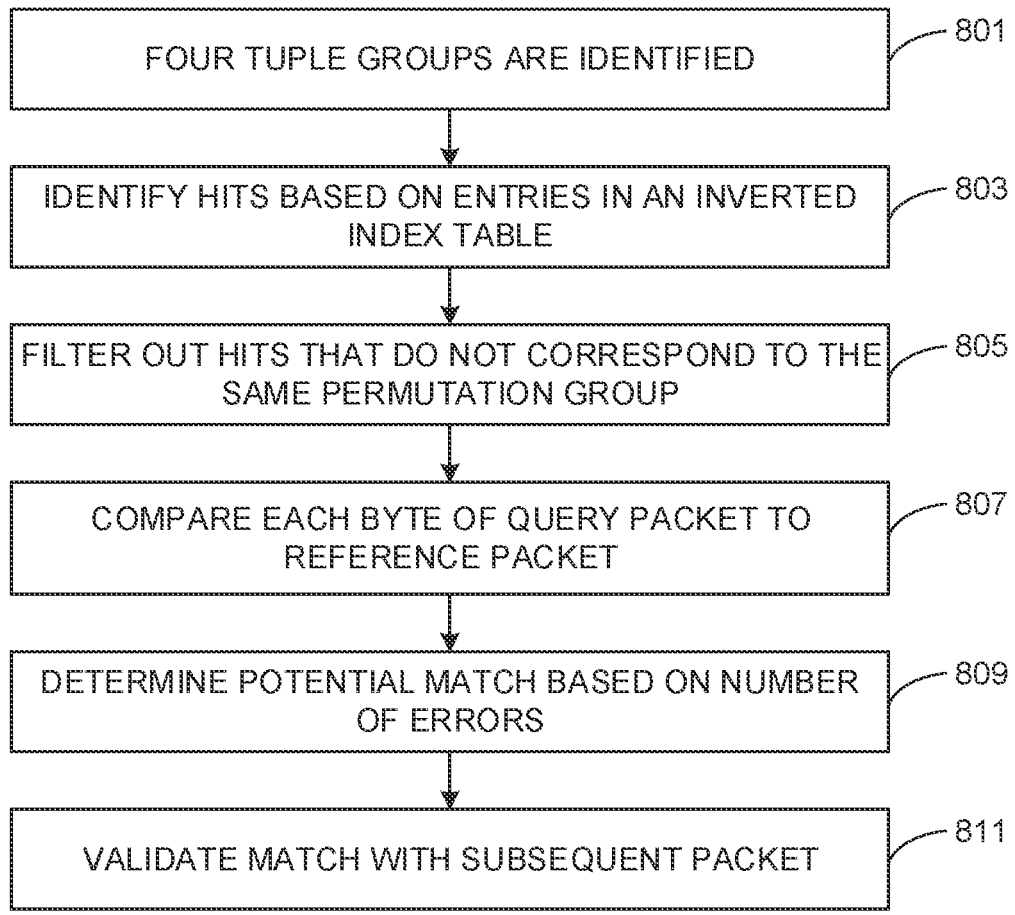
FIG. 8 shows a flowchart representative of example machine readable instructions for implementing the apparatus of FIG. 3A.

Flowcharts representative of example machine readable instructions for implementing the apparatus 301 of FIG. 3 are shown in FIGS. 7 and 8. In these examples, the machine readable instructions comprise one or more programs for execution by a processor such as the processor 912 shown in the example processor platform 900 discussed below in connection with FIGS. 7 and 8. The programs may be embodied in software stored on a tangible computer readable storage medium such as a CD-ROM, a floppy disk, a hard drive, a digital versatile disk (DVD), a Blu-ray disk, or a memory associated with the processor 912, but the entire program(s) and/or parts thereof could alternatively be executed by a device other than the processor 912 and/or embodied in firmware or dedicated hardware. Further, although the example programs are described with reference to the flowcharts illustrated in FIGS. 8 and 9, many other methods of implementing the example apparatus 301 may alternatively be used. For example, the order of execution of the blocks may be changed, and/or some of the blocks described may be changed, eliminated, or combined.

As mentioned above, the example processes of FIGS. 8 and 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8 and 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

An example, program 700 that may be executed to implement the example system 301 is illustrated in FIG. 7. Referring to FIG. 7 and the preceding figures and associated descriptions, the example program 700 begins with the row sorter 501 sorts each row of a (audio signature) matrix that includes rows and columns, based on a designated strength of the bits that are located in that row (block 701). In some examples, based on the determined strength of the bits that are located in the rows three rows, are retained. In other examples, other numbers of rows are retained.

The bit identifier 503 identifies a predetermined number of bits in each row of the matrix as the strongest bits in that row (block 703). In some examples, three bits are identified as the strongest bits in each row. In other examples, other numbers of bits are identified as the strongest bits in each row. In some examples, the predetermined number of bits in each row of the matrix that are identified as the strongest bits in that row provide equal representation to the 32 frequency bands of a signature.

The vector generator 505 generates a vector that corresponds to the cells of the matrix (block 705). In one example, the vector is formed by concatenating the rows of the matrix. In one example, the rows of the matrix are concatenated to form a 2048-bit vector. In other examples, the rows of the matrix are concatenated to form a vector having another number of bits.

The distributed number set generator 507 generates a set of uniformly distributed numbers within a range of numbers corresponding to cells of the matrix (block 707). In some examples, the set of uniformly distributed numbers are generated to encode the distributed "1" bits of the vector. In some examples, a uniformly distributed array of 46 numbers in the range of 60 to 1980 is generated. In some examples, uniformly distributed arrays of any suitable size, with numbers in other suitable ranges are used.

The distance determiner 509 determines a numerical distance from each number in the set of uniformly distributed numbers, to a numbered location of the matrix that is associated with a nearest occurrence of a bit set to one (block 709). For example, each number in the set of uniformly distributed numbers is used as a starting index in a vector from which to measure the distance to the first occurrence of a bit "1".

The integer generator 511 generates a set of integers based on the distance determined by distance determiner (block 711). In some examples, based on a 2048-bit vector, a set of 48 integers is generated. In other examples, other numbers of integers can be generated. In one example, the set of 48 integers represents an entire row covering the 4.096 seconds. In one example, a 6-bit representation of each of the integers is generated.

The example program 800 that may be executed to implement the example is illustrated in FIG. 8. Referring to FIG. 8 and the preceding figures and associated descriptions, the example program 800 begins with the tuple grouper 601 identifying four tuple groups from a query packet (block 801). In some examples, four successive tuples of 6 bit numbers are grouped to create a 24 bit look up table entry.

The hit identifier 603 identifies hits based on entries in an inverted index table (block 803). In some examples, hits have a group index that is the same as the group index in the query.

The hit falterer 605 filters out hits that do not correspond to the same permutation group (805). For example, in some examples, if the $5^{th}$ 4-tuple from the query is used then only those locations in the reference where the group index on the reference is also the $5^{th}$ 4-tuple are extracted from the "hits".

The comparer 607 compares each byte of the query packet to each byte of a reference packet across a predetermined number of bytes (807). At the extracted location an integer-to-integer comparison is done between the 48 numbers of the reference and the 48 numbers of the query.

The match determiner 609 determines a potential match if there are less than a predetermined number of errors (block 809). In one example, a potential match is determined, if there are less than 24 mismatches. In one example, a computationally expensive Hamming Distance calculation is avoided by using simple integer matching. Another important feature is that the individual integers of the vector representing a match row are obtained via a random traverse through the 2048 long MINHASH array. This makes each 4-tuple fairly unique and reduces the number of false "hits".

The match validator 611 validates the match that is determined by the match determiner 611 with a subsequent packet (block 811).

By analyzing a large variety of audio with a total duration exceeding 1000 hours it can be determined that certain 4-tuple values associated with certain group indexes occur extremely frequently and may result in false matches. These are eliminated from the inverted index table.

Figure 9:
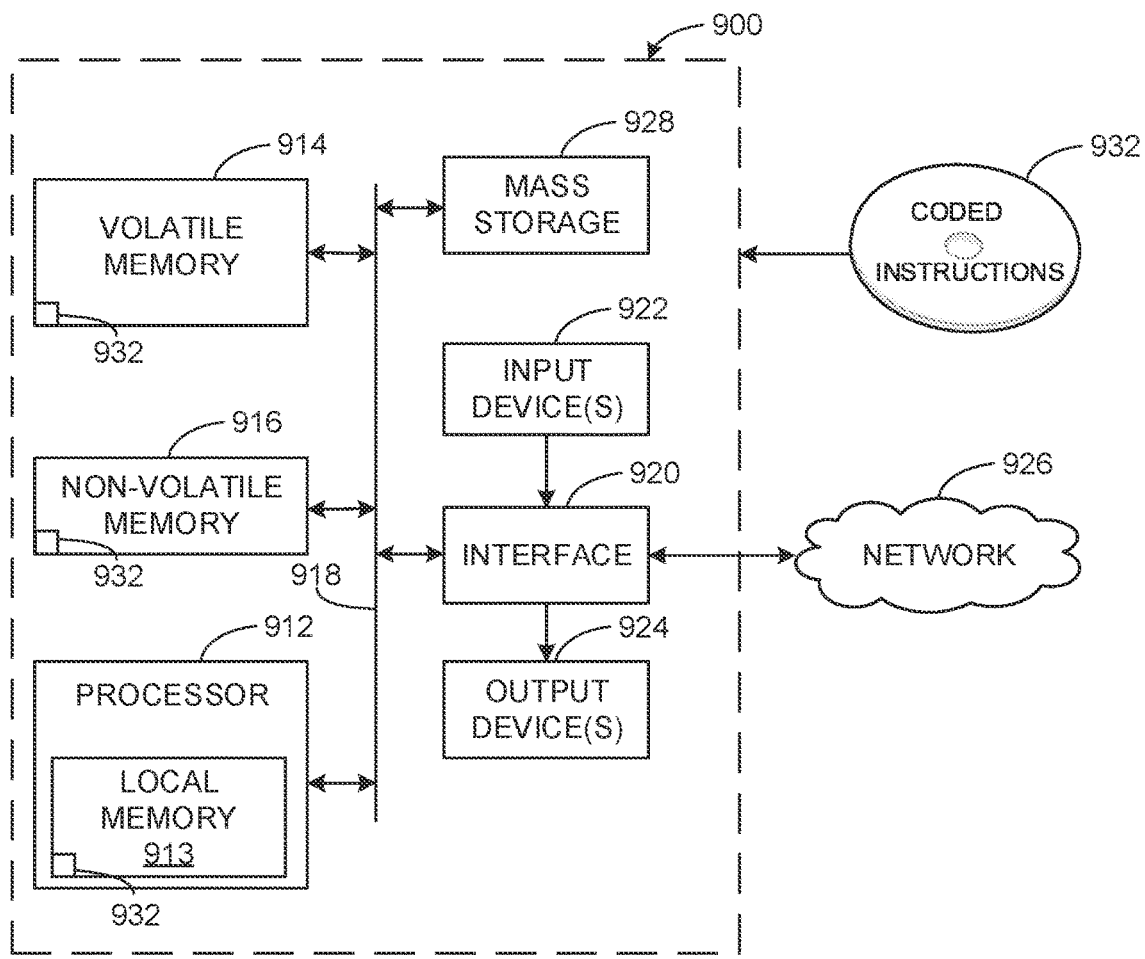
FIG. 9 is a block diagram of an example processor platform structured to execute the instructions of FIGS. 8 and 9 to implement the apparatus of FIG. 3A.

FIG. 9 is a block diagram of an example processor platform 900 capable of executing the instructions of FIGS. 7 and/or 8 to implement the apparatus of FIGS. 5 and 6. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 7 and 8 may be stored in the mass storage device 928, in the volatile memory 914, in the non-volatile memory 916, and/or on a removable tangible computer readable storage medium such as a CD or DVD. In some examples, components of the example audio signature generator 301a, such as the example row sorter 501, the example bit identifier 503, the example vector generator 505, the example distributed number set generator 507, the example distance determiner 509 and the example integer generator 511 are implemented by a processor such as processor platform 900. Furthermore, in some examples, components of the example signature matcher 301c such as the example tuple grouper 601, the example hit identifier 603, the example hit filterer 605, the example comparer 607, the example match determiner 609 and the example match validator 611 are implemented by a processor such as processor platform 900.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   at least one memory;
   computer readable instructions; and processor circuitry to execute the computer readable instructions to at least:

identify respective first groups of bits in respective rows of an audio signature matrix, the respective first groups of bits having respective strengths that are larger than respective strengths of other bits in the respective rows, a strength of a bit based on energy values of an audio signal used to determine the bit;

replace bits of the audio signature matrix with corresponding cells that include multi-bit binary values to form a sparse array, the multi-bit binary values assigned to the cells based on whether a respective one of the cells is to replace a corresponding one of the first groups of bits in a corresponding row of the audio signature matrix;

generate a sequence of uniformly distributed numbers within a numeric range, respective ones of the sequence of uniformly distributed numbers to represent respective starting indices in the sparse array to be used to determine corresponding distances to respective next non-zero bits in the sparse array;

generate a set of integers based on distances from (i) the respective starting indices of the sparse array corresponding to respective ones of the sequences of uniformly distributed numbers to (ii) the respective next non-zero bits of the sparse array; and generate a signature based on the set of integers.

2. The apparatus of claim 1, wherein the multi-bit binary values assigned to the cells are either a binary value of 10 or a binary value of 01.

3. The apparatus of claim 1, wherein the sequence of uniformly distributed numbers includes a distributed array of 48 numbers in a range of 60 to 1980.

4. The apparatus of claim 1, wherein respective ones of the set of integers have a 6 bit representation.

5. The apparatus of claim 1, wherein to replace the bits of the audio signature matrix with the corresponding cells, the processor circuitry is to:

replace the first groups of bits with cells having non-zero binary values; and replace other groups of bits not in the first groups of bits with cells having binary values corresponding to zero.

6. The apparatus of claim 1, wherein the processor circuitry is to generate the audio signature matrix based on the audio signal.

7. At least one non-transitory computer readable medium comprising computer readable instructions that, when executed, cause at least one processor to at least:

identify respective first groups of bits in respective rows of an audio signature matrix, the respective first groups of bits having respective strengths that are larger than respective strengths of other bits in the respective rows, a strength of a bit based on energy values of an audio signal used to determine the bit;

replace bits of the audio signature matrix with corresponding cells that include multi-bit binary values to form a sparse array, the multi-bit binary values assigned to the cells based on whether a respective one of the cells is to replace a corresponding one of the first groups of bits in a corresponding row of the audio signature matrix;

generate a sequence of uniformly distributed numbers within a numeric range, respective ones of the sequence of uniformly distributed numbers to represent respective starting indices in the sparse array to be used to determine corresponding distances to respective next non-zero bits in the sparse array;

generate a set of integers based on distances from (i) the respective starting indices of the sparse array corresponding to respective ones of the sequences of uniformly distributed numbers to (ii) the respective next non-zero bits of the sparse array; and generate a signature based on the set of integers.

8. The at least one non-transitory computer readable medium of claim 7, wherein the multi-bit binary values assigned to the cells are either a binary value of 10 or a binary value of 01.

9. The at least one non-transitory computer readable medium of claim 7, wherein the sequence of uniformly distributed numbers includes a distributed array of 48 numbers in a range of 60 to 1980.

10. The at least one non-transitory computer readable medium of claim 7, wherein respective ones of the set of integers have a 6 bit representation.

11. The at least one non-transitory computer readable medium of claim 7, wherein to replace the bits of the audio signature matrix with the corresponding cells, the instructions are to cause the at least one processor to:

replace the first groups of bits with cells having non-zero binary values; and replace other groups of bits not in the first groups of bits with cells having binary values corresponding to zero.

12. The at least one non-transitory computer readable medium of claim 7, wherein the instructions are to cause the at least one processor to generate the audio signature matrix based on the audio signal.

13. A method comprising:

identifying, by executing an instruction with at least one processor, respective first groups of bits in respective rows of an audio signature matrix, the respective first groups of bits having respective strengths that are larger than respective strengths of other bits in the respective rows, a strength of a bit based on energy values of an audio signal used to determine the bit;

replacing, by executing an instruction with the at least one processor, bits of the audio signature matrix with corresponding cells that include multi-bit binary values to form a sparse array, the multi-bit binary values assigned to the cells based on whether a respective one of the cells is to replace a corresponding one of the first groups of bits in a corresponding row of the audio signature matrix;

generating, by executing an instruction with the at least one processor, a sequence of uniformly distributed numbers within a numeric range, respective ones of the sequence of uniformly distributed numbers to represent respective starting indices in the sparse array to be used to determine corresponding distances to respective next non-zero bits in the sparse array;

generating, by executing an instruction with the at least one processor, a set of integers based on distances from (i) the respective starting indices of the sparse array corresponding to respective ones of the sequences of uniformly distributed numbers to (ii) the respective next non-zero bits of the sparse array; and generating a signature based on the set of integers.

14. The method of claim 13, wherein the multi-bit binary values assigned to the cells are either a binary value of 10 or a binary value of 01.

15. The method of claim 13, wherein the sequence of uniformly distributed numbers includes a distributed array of 48 numbers in a range of 60 to 1980.

16. The method of claim 13, wherein respective ones of the set of integers have a 6 bit representation.

17. The method of claim 13, wherein the replacing of the bits of the audio signature matrix with the corresponding cells includes:
   replacing the first groups of bits with cells having non-zero binary values; and
   replacing other groups of bits not in the first groups of bits with cells having binary values corresponding to zero.

18. The method of claim 13, further including generating the audio signature matrix based on the audio signal.

\* \* \* \* \*